Oct. 27, 1953    F. H. STEARNS    2,657,105
BEARING CONSTRUCTION
Filed Aug. 28, 1952

INVENTOR
FRANK H. STEARNS
BY Owen W. Kennedy
ATTORNEY

Patented Oct. 27, 1953

2,657,105

UNITED STATES PATENT OFFICE 2,657,105

BEARING CONSTRUCTION

Frank H. Stearns, Meriden, N. H., assignor to Split Ballbearing Corporation, Lebanon, N. H., a corporation of New Hampshire Application August 28, 1952, Serial No. 306,751

4 Claims. (Cl. 308—196)

The present invention relates to bearings of the divisible race type, in which the outer race element is fractured in order to permit expansion thereof for the insertion of bearing balls or rollers into the space between the inner and outer race elements.

In the copending application of Frank H. Stearns and Arthur J. Thibault, filed April 2, 1949, Serial No. 85,074, there is shown and described a bearing with an outer race element which is in the form of a unitary ring fractured longitudinally of its axis in a predetermined radial plane, with a pair of abutting broken ends at the fracture. Since this ring has been hardened prior to its fracture, its broken ends are normally positioned in intimate interlocking relation by the inherent resiliency of the hardened metal. Therefore, when the ring is expanded by separating the broken ends under pressure to permit the insertion of bearing balls or rollers, release of the expanding pressure results in the ring resuming its original form with its fractured ends in mating relation.

The fact that the fractured ends of the outer ring will be positioned in interlocking mating relation with each other in the completed bearing assembly is an important characteristic of the bearing construction disclosed in the aforesaid copending application. This is because the inner surface of the outer ring which is engaged by the balls will always be smooth, due to the fact that the line of fracture is irregular, and that the broken ends will remain in mating relation by reason of the inherent resiliency of the hardened metal of the outer ring.

The object of the present invention is to provide an improved bearing construction of the above described type, wherein the outer ring is provided with means for maintaining the broken ends in intimate interlocking mating relation under all conditions in which the bearing assembly may be used. While, generally speaking, the inherent resiliency of the fractured ring will maintain this relation, the handling and shipping of the bearing assembly sometimes results in minute particles of dirt getting into the fracture far enough to separate the broken ends. Furthermore, under some conditions of use, the outer ring might be used in connection with a supporting member with which the outer race ring has a relatively loose fit such as would permit separation of the fractured ends of the ring when the bearing is subjected to loading.

According to the present invention the outer race ring is provided with a locking member of circular form that can be readily applied to the bearing after it has been assembled so as to effectively prevent separation at the broken ends under any conditions of handling and shipping of the bearing, and its subsequent use.

The above and other advantageous features of the invention will hereinafter more fully appear from the following description, considered in connection with the accompanying drawings, in which, Fig. 1 is a plan view of a complete bearing assembly embodying the present invention.

Figure 1:
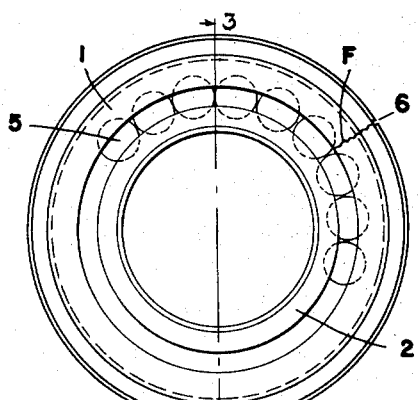
Figure 2:
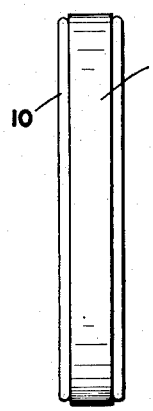
Fig. 2 is a view in side elevation of the bearing assembly shown in Fig. 1.
Figures 3, 4:
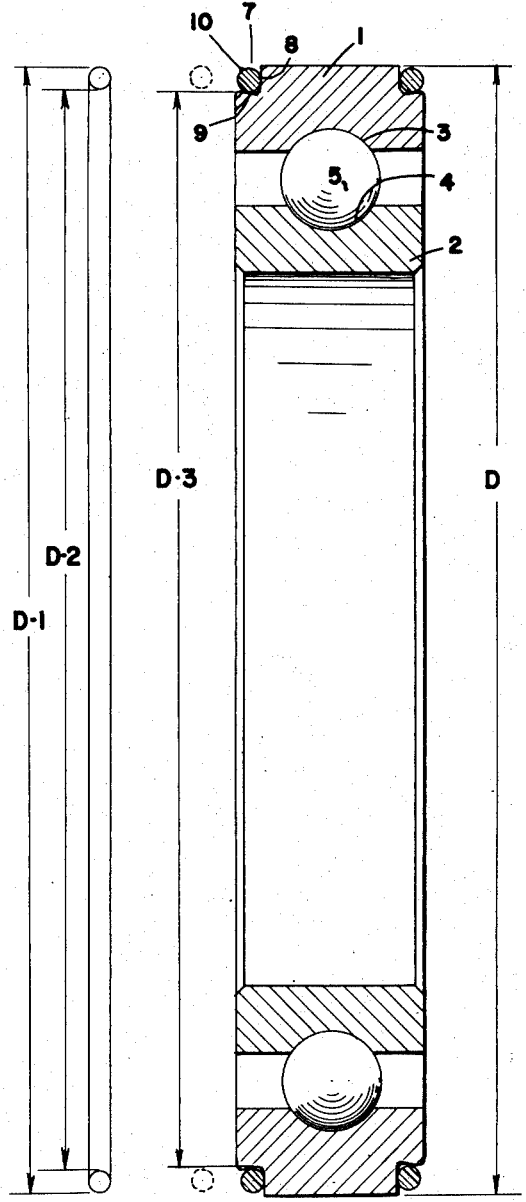
Fig. 3 is a transverse sectional view on an enlarged scale, along the line 3—3 of Fig. 1.
Fig. 4 is a view in side elevation of one of the locking members.

Referring first to Figs. 1 and 3, the bearing assembly is shown as comprising an outer race 1 and an inner race 2 provided with grooves 3 and 4 respectively, in which are received a series of balls 5. The outer race 1 is made in the form of a ring from a single cylindrical piece of metal which is machined to its final dimensions both inside and out, with the inner surface of the ring being provided with the ball-receiving groove 3.

The outer race 1 also provides a score 6 extending across the outside surface of the ring parallel to its longitudinal axis. The purpose of this score 6 is to form a plane of weakness in the ring 1, so that when it is broken the fracture will occur in a substantially radial plane. Following the formation of the race ring 1 with its groove 3 and score 6, the ring is hardened by suitable heat treating methods, the ultimate degree of hardness being such as to permit the ring to be separated a predetermined distance in the area of its subsequent fracture, without exceeding the elastic limit of the metal.

After the race ring 1 has been hardened, it is broken along the plane of weakness as determined by location of the score 6, with the breaking force being applied at right angles to this plane. Preferably, the expansion members disclosed in the aforesaid copending application Serial No. 85,074, are used to insure that the fracture occurs in a generally radial plane opposite to the score 6, with the irregular line of fracture being indicated at F in Fig. 1.

It is to be understood that the fracturing described above does not distort the ring itself, and that the ring after fracturing will present an entirely closed formation. Furthermore, the existence of the fracture F will not present any detrimental parting line in the area of the ball-receiving groove 3, since the inner surfaces of the ring in the zone of fracture mate together in perfect interlocking relation.

After the race ring 1 has been fractured as described above, the parts of the bearing are assembled by positioning the inner race ring 2 within the outer ring and spreading the outer ring 1 apart in the area of its fracture F a distance sufficient to permit insertion of the balls between the rings and within the grooves 3 and 4. As soon as a full complement of balls has been inserted between the race rings 1 and 2, the release of the expanding force as applied to the ring 1 results in the ring resuming its original form of a complete circle, with its fractured ends in intimate interlocking relation.

Figure 5:
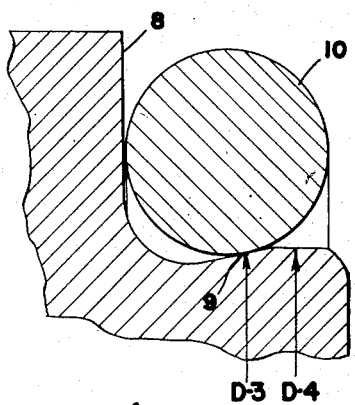
Fig. 5 is a larger scale fragmentary sectional view illustrating one of the race ring grooves for the reception and seating of the locking member of Fig. 4.

As previously pointed out, the object of the present invention is to provide means for preventing any separation of the outer ring 1 at the fracture F after the complete bearing has been assembled as described above. For this purpose, each edge of the outer race ring 1 is formed with an open groove 7 which, as best shown in Fig. 5, provides an inner face 8 in a plane substantially at right angles to the bearing axis, and a circumferential face 9 which is suitably contoured to receive and retain in place a locking ring 10. When once placed in position, this ring 10 will effectively prevent any spreading of the outer race ring 1 due to the fact that the ring 10 is seated in the acute angle between the faces 8 and 9 of the groove 7.

The locking ring 10 is shown separately in Fig. 4 as having an outside diameter D-1 that is slightly less than the outside diameter D of the outer race ring 1. As previously pointed out, the race ring 1 is machined to its final dimensions before being fractured, so that the diameter D is determined by the size of the opening in the part which is to receive the outer race ring 1 when the bearing is in use. Making the diameter D-1 of the locking ring 10 slightly less than the diameter D, insures that when the ring 10 is mounted in the groove 7, it cannot extend beyond the finished outer surface of the race ring 1.

The inside diameter D-2 of the locking ring 10 is slightly less than the diameter D-3 at the point of contact of the ring 10 with the outwardly inclined portion of groove face 9. Therefore, in order to install the locking ring 10 in the groove 7 it is necessary to expand the ring until its inside diameter D-2 approximates the diameter D-4 of the face 9 beyond the inclined portion, as indicated in dotted lines on an exaggerated scale in Fig. 3.

The locking ring 10 is preferably composed of wire of high tensile strength and the ring can be formed by welding together the ends of a predetermined length of such wire to obtain a ring of the desired outside and inside diameters D-1 and D-2 respectively. Application of the ring 10 to the groove 7 is accomplished through expansion of the ring by heat, or mechanical means, until its inside diameter D-2 is increased to the point where the ring will pass over that portion of the groove face 9 having the diameter D-4. The amount that the ring 10 is expanded is very small, in the order of thousandths of an inch, so that contraction of the ring to its original diameter upon cooling, or release of the expanding force as it enters the groove 7, will result in seating the ring tightly in the acute angle between the groove faces 8 and 9, with the ring 10 being under a slight tension.

As an example of the relation that exists between the various diameters referred to above, it is noted that D-2 equals D-3 minus .002" and
D-4 equals D-3 plus .002".

While the ring 10 is shown composed of wire circular in cross section, obviously other sections could be employed with the same results.

I claim:

1. A bearing structure comprising inner and outer metal race rings, a plurality of bearing elements disposed within and between said rings, the outer ring being fractured radially so as to provide a pair of abutting broken ends, said outer ring having been hardened prior to its fracture so that its broken ends are normally positioned in intimate interlocking mating relation with each other by the inherent resiliency of the hardened metal, and a rigid annular member mounted on said outer ring for locking the broken ends thereof together, said locking member being disposed entirely within the outer periphery of said ring and being held in tension.

2. A bearing structure comprising inner and outer metal race rings, a plurality of bearing elements disposed within and between said rings, the outer ring being fractured radially so as to provide a pair of abutting broken ends, said outer ring having been hardened prior to its fracture so that its broken ends are normally positioned in intimate interlocking mating relation with each other by the inherent resiliency of the hardened metal, and said outer race ring having an external groove with a face inclined outwardly with respect to the axis of said ring, and a rigid annular member seated in said groove and engaging the inclined face thereof for locking the broken ends of said race ring together.

3. A bearing structure comprising inner and outer metal race rings, a plurality of bearing elements disposed within and between said rings, the outer ring being fractured radially so as to provide a pair of abutting broken ends, said outer ring having been hardened prior to its fracture so that its broken ends are normally positioned in intimate interlocking mating relation with each other by the inherent resiliency of the hardened metal, and said outer race ring having a circumferential groove with an inner face and a second outwardly inclined face, and a solid ring seated in the acute angle between the faces of said groove for locking the ends of said race ring together, with the inside diameter of said locking ring being less than the diameter of a portion of said inclined groove face so that the ring is held in position.

4. A bearing structure comprising inner and outer metal race rings, a plurality of bearing elements disposed within and between said rings, the outer ring being fractured radially so as to provide a pair of abutting broken ends, said outer ring having been hardened prior to its fracture so that its broken ends are normally positioned in intimate interlocking mating relation with each other by the inherent resiliency of the hardened metal, and said outer race ring having a circumferential groove with a contoured face of varying diameter extending around its outer periphery, the diameter of which groove is greatest at said race ring end, and a solid ring seated in said groove for locking the broken ends of the race ring together, with the inside diameter of said locking ring being intermediate the minimum and maximum diameters of said groove, and with the outside diameter of said locking ring being less than the outside diameter of said race ring.

FRANK H. STEARNS.

No references cited.